United States Patent
Jin et al.

(10) Patent No.: US 11,295,425 B2
(45) Date of Patent: Apr. 5, 2022

(54) GAZE DIRECTION-BASED ADAPTIVE PRE-FILTERING OF VIDEO DATA

(71) Applicant: Apple Inc., Cupertino, CA (US)

(72) Inventors: Can Jin, San Jose, CA (US); Nicolas Pierre Marie Frederic Bonnier, Campbell, CA (US); Hao Pan, Sunnyvale, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 17/112,708

(22) Filed: Dec. 4, 2020

(65) Prior Publication Data
US 2021/0090225 A1    Mar. 25, 2021

Related U.S. Application Data

(63) Continuation of application No. 16/040,496, filed on Jul. 19, 2018, now Pat. No. 10,861,142.

(60) Provisional application No. 62/535,734, filed on Jul. 21, 2017.

(51) Int. Cl.
| | |
|---|---|
| G06T 19/00 | (2011.01) |
| G06F 3/01 | (2006.01) |
| G06T 5/20 | (2006.01) |
| G02B 27/01 | (2006.01) |

(52) U.S. Cl.
CPC ............ *G06T 5/20* (2013.01); *G02B 27/017* (2013.01); *G06F 3/013* (2013.01); *G06T 19/006* (2013.01)

(58) Field of Classification Search
CPC combination set(s) only.
See application file for complete search history.

(56) References Cited

U.S. PATENT DOCUMENTS

| | | | |
|---|---|---|---|
| 5,446,501 A | 8/1995 | Takemoto et al. | |
| 6,166,748 A | * 12/2000 | Van Hook | A63F 13/00 345/522 |
| 6,959,450 B1 | 10/2005 | Ritter et al. | |
| 9,118,932 B2 | 8/2015 | Avadhanam et al. | |
| 9,588,341 B2 | 3/2017 | Bar-Zeev et al. | |
| 10,861,142 B2 | 12/2020 | Jin et al. | |

(Continued)

FOREIGN PATENT DOCUMENTS

EP    1205881    5/2002

OTHER PUBLICATIONS

Sanghoon Lee, et al., "Foveated Video Compression with Optimal Rate Control," IEEE Transactions on Image Processing, vol. 10, No. 7, Jul. 2001, pp. 977-992.

(Continued)

*Primary Examiner* — Helen Zong
(74) *Attorney, Agent, or Firm* — Robert C. Kowert; Kowert, Hood, Munyon, Rankin & Goetzel, P.C.

(57) ABSTRACT

A multi-layer low-pass filter is used to filter a first frame of video data representing at least a portion of an environment of an individual. A first layer of the filter has a first filtering resolution setting for a first subset of the first frame, while a second layer of the filter has a second filtering resolution setting for a second subset. The first subset includes a data element positioned along a direction of a gaze of the individual, and the second subset of the frame surrounds the first subset. A result of the filtering is compressed and transmitted via a network to a video processing engine configured to generate a modified visual representation of the environment.

20 Claims, 10 Drawing Sheets

(56) References Cited

U.S. PATENT DOCUMENTS

| | | | |
|---|---|---|---|
| 2004/0207632 A1 | 10/2004 | Miller et al. | |
| 2007/0172211 A1* | 7/2007 | Panda | H04N 19/152 |
| | | | 386/313 |
| 2012/0001901 A1 | 1/2012 | Park | |
| 2012/0319928 A1 | 12/2012 | Rhodes | |
| 2013/0088413 A1 | 4/2013 | Raffle et al. | |
| 2014/0139655 A1* | 5/2014 | Mimar | G08B 21/0476 |
| | | | 348/77 |
| 2014/0184475 A1 | 7/2014 | Tantos et al. | |
| 2014/0247277 A1 | 9/2014 | Guenter et al. | |
| 2014/0341293 A1* | 11/2014 | Chen | H04N 13/161 |
| | | | 375/240.16 |
| 2014/0369613 A1 | 12/2014 | Avadhanam et al. | |
| 2015/0003819 A1 | 1/2015 | Ackerman et al. | |
| 2015/0092847 A1* | 4/2015 | Su | H04N 19/33 |
| | | | 375/240.12 |
| 2015/0195566 A1* | 7/2015 | Hinz | H04N 19/187 |
| | | | 375/240.13 |
| 2016/0155218 A1* | 6/2016 | Svensson | G06T 5/40 |
| | | | 382/165 |
| 2016/0267884 A1 | 9/2016 | Binstock et al. | |
| 2016/0327793 A1 | 11/2016 | Chen et al. | |
| 2017/0018688 A1* | 1/2017 | Mazed | H01L 27/14627 |
| 2017/0024861 A1* | 1/2017 | Arata | H04N 5/23229 |
| 2017/0078718 A1 | 3/2017 | Ioffe | |
| 2017/0169602 A1 | 6/2017 | Blackmon et al. | |
| 2017/0287496 A1* | 10/2017 | Heitkamp | G10L 19/008 |
| 2018/0096471 A1* | 4/2018 | Wilson | G02B 27/0172 |
| 2018/0293437 A1* | 10/2018 | Dempsey | H04N 5/23222 |
| 2019/0026874 A1* | 1/2019 | Jin | G02B 27/017 |
| 2019/0082276 A1* | 3/2019 | Crow | H04R 25/50 |
| 2019/0272036 A1* | 9/2019 | Grant | G06F 3/012 |
| 2019/0324478 A1* | 10/2019 | Lin | B64C 19/00 |
| 2019/0329118 A1* | 10/2019 | Balakrishnan | A61B 5/01 |
| 2020/0242381 A1* | 7/2020 | Chao | B60W 60/001 |
| 2020/0327372 A1* | 10/2020 | Anschuetz | G06K 9/628 |

OTHER PUBLICATIONS

Evgeny Kuzyakov, "Next-generation video encoding techniques for 360 video and VR", Engineering Blog, Facebook Code, Retrieved from URL: https://code.facebook.com/posts/1126354007399553nextgenerationvideoencodingtechniquesfor360videoandvr/ on Apr. 24, 2017, pp. 1-8.

Zhou Wang et al., "Foveated Image and Video Coding", Chapter 14 in Digital Video Image Quality and Perceptual Coding, Marcel Dekker Series in Signal Processing and Communications, Nov. 2005, pp. 1-29.

U.S. Appl. No. 15/965,539, filed Apr. 27, 2018, D. Amnon Silverstein.

International Search Report and Written Opinion from PCT/US2018/043033, dated Oct. 5, 2018, Apple Inc., pp. 1-16.

Office action and Search report from Chinese Application No. 201880047355.2, dated Sep. 18, 2021, pp. 1-13.

* cited by examiner

GAZE DIRECTION-BASED ADAPTIVE PRE-FILTERING OF VIDEO DATA

This application is a continuation of U.S. patent application Ser. No. 16/040,496, filed Jul. 19, 2018, which claims benefit of priority to U.S. Provisional Application Ser. No. 62/535,734, filed Jul. 21, 2017, and which are incorporated herein by reference in their entirety.

BACKGROUND

Technical Field

This disclosure relates generally to systems and algorithms for processing and transmission of video data.

Description of the Related Art

As the technology for capturing video has improved and become less expensive, more and more applications with video components are becoming become popular. For example, mixed reality applications (applications in which real-world physical objects or views may be augmented with virtual objects or relevant supplementary information) and/or virtual reality applications (applications in which users may traverse virtual environments), in both of which video data may be captured and manipulated, are an increasing focus of development and commercialization. For at least some applications, video data representing the environment may be processed at a device other than the video capture device itself; that is, video data may have to be transmitted over a network path (such as a wireless link) which may have relatively low bandwidth capacity relative to the rate at which raw video data is captured. Depending on the video fidelity needs of the application, managing the flow of video data over constrained network pathways while maintaining high levels of user satisfaction with the application may present a non-trivial technical challenge.

SUMMARY OF EMBODIMENTS

Various embodiments of methods and apparatus for gaze direction-based pre-filtering of video data are described. In at least some embodiments, the filtering techniques may take advantage of the fact that the visual acuity or precision of perception in the human visual system typically decreases as a function of the angular distance away from the central direction of the gaze—the portion of a visible scene which is sensed using a centrally-located region of the retina called the fovea is typically perceived with greater sharpness than portions of the scene sensed using portions of the retina that are located away from the fovea. Taking this biological phenomenon into consideration, video data which is to be transmitted over a network may be pre-filtered (prior to compression) using a configurable multi-layer low-pass filter in various embodiments, with outer or peripheral regions of the visible scene being filtered at lower resolution settings relative to the inner or central regions relative to the direction of the gaze, thereby helping to reduce the total amount of data that has to be transmitted over the network.

According to at least one embodiment, a method may comprise tracking the direction of the gaze of an individual, e.g., using one or more sensors of a head-mounted device such as a headset or helmet which are directed towards the individual's eyes. The method may include filtering one or more frames of video data representing at least a portion of an environment of the individual using a multi-layer low-pass filter. A given frame of video data which is filtered may include representations of one or more physical objects and/or virtual objects (e.g., objects generated by virtual reality or augmented reality applications) in various embodiments. The filter may include at least two layers in various embodiments: a first layer which has a first filtering resolution setting for a first subset of a given frame of video data, and a second layer which has a second filtering resolution setting for a second subset of the given frame. The portions of any given frame which are filtered using the respective filter layers may be selected dynamically based on the direction of the individual's gaze in various embodiments. For example, with respect to a given frame, the first subset of the frame (corresponding to the filter layer with the highest resolution) may include data elements positioned in an area corresponding to the central direction of the gaze, while the second subset of the frame (corresponding to a filter layer with a lower resolution setting) may correspond to a region surrounding the first subset. After a given set of video data such as a frame is filtered using the multi-layer low pass filter, the data may be compressed and transmitted via a network to a video processing engine in some embodiments.

In at least one embodiment, the video processing engine may be configured to generate a modified visual representation of the environment—e.g., by augmenting the originally-viewed scene with virtual objects or with supplementary information about real objects that are visible—and transmit the modified version for viewing by the individual. As the individual interacts with the visible environment (which may comprise a mix of real and virtual objects in some embodiments, and may be referred to as a mixed-reality environment), the direction of the individual's gaze may change from one set of displayed/visible frame to another in various embodiments. In such embodiments, the modified direction of the individual's gaze may be determined, and different subsets of the video frames may be selected for processing using the various layers as the gaze direction changes. That is, if the subset of a given frame which is filtered using a particular layer of the filter is compared to the subset of a different frame (after the individual has changed gaze direction), the second subset may have a different relative position within its frame than the first subset.

In various embodiments, the tracking of the gaze, the pre-filtering of the video data, and the compression of the filter results, may all be performed at components (e.g., using a combination of sensors and other hardware and software) of a wearable device such as a head-mounted display (HMD) of a mixed-reality application environment or system, or a virtual reality application or system. The video processing may be performed, for example, using a base station with which the wearable device communicates via a network pathway such as a wireless or wired connection.

In at least some embodiments, the portions of a given frame or set of video data which lie at and near the boundaries of the different layers may be processed using a blended technique. For example, in one embodiment, a blending target set of data elements corresponding to a border region between a first subset of a frame corresponding to the first filtering layer, and a second subset of the frame corresponding to the second filtering layer may be identified. Both layers of the filter may be applied separately to the blending target set in some embodiments, and the filter output of the two layers may be combined using a blending function which smooths the transition between the two regions, thereby reducing the probability of unsightly visual artifacts in the video which may be generated after processing.

The shapes of the regions processed using the different filter layers may differ in different embodiments. For example, in one embodiment, the outer perimeter of a given region or frame subset may comprise a circle, an oval, a polygon such as a square or a rectangle, or any other regular or irregular desired shape. In at least some embodiments, the subsets of the frame corresponding to different filter layers may be roughly or approximately concentric, but the perimeters of the different subsets need not have the same shape. For example, the central or highest-resolution subset may be roughly circular, a surrounding second layer subset may have an oval outer perimeter, while a third layer subset surrounding the second layer may have a rectangular outer perimeter.

Values of a number of parameters for the pre-filtering may be selected based at least in part on feedback from one or more individuals in different embodiments. Such parameters may include, for example, the number of layers in the multi-layer low-pass filter, the size of a subset of a frame which is to be filtered using a particular layer of the multi-layer low-pass filter or the filtering resolution setting of a particular layer of the multi-layer low-pass filter. In some embodiments, the results of user studies may be analyzed to determine default settings for the parameters, while at least some of the settings may be changed from the defaults and customized based on feedback received from the particular individual utilizing a wearable device at which the filtering is performed. In some embodiments, filtering-related parameters of a wearable device may be re-calibrated in response to a request from the individual wearing the device. In one embodiment, instead of requiring a re-calibration procedure for changing parameter settings, one or more settings may be modified automatically, e.g., in response to detecting that the gaze of the individual is directed in an unexpected direction for some period of time.

According to one embodiment, a system may comprise one or more processors, one or more sensors, and one or more memories. The memories may store program instructions that when executed on the one or more processors may implement a method comprising filtering of video data using a multi-layer low-pass filter. A first layer of the filter may differ in resolution setting from a second layer; for example, the first layer may have a higher resolution setting than the second, and may be used for processing elements of a frame which are closest to the central direction of an individual's gaze, while the second layer is used for a portion of the frame which surrounds the subset processed using the first layer. The direction of the gaze may be detected and tracked dynamically using the one or more sensors in various embodiment. The output of the multi-layer filter may be compressed and transmitted to a video processing engine in various embodiments.

According to another embodiment, a non-transitory computer-accessible storage medium may store program instructions. When executed on one or more processors cause the program instructions may cause the one or more processors to perform a method comprising filtering of video data using a multi-layer low-pass filter. A first layer of the filter may differ in resolution setting from a second layer; for example, the first layer may have a higher resolution setting than the second, and may be used for processing elements of a frame which are closest to the central direction of an individual's gaze, while the second layer is used for a portion of the frame which surrounds the subset processed using the first layer. The output of the multi-layer filter may be compressed and transmitted to a video processing engine in various embodiments.

While embodiments are described herein by way of example for several embodiments and illustrative drawings, those skilled in the art will recognize that embodiments are not limited to the embodiments or drawings described. It should be understood, that the drawings and detailed description thereto are not intended to limit embodiments to the particular form disclosed, but on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include," "including," and "includes" mean including, but not limited to. When used in the claims, the term "or" is used as an inclusive or and not as an exclusive or. For example, the phrase "at least one of x, y, or z" means any one of x, y, and z, as well as any combination thereof.

DETAILED DESCRIPTION

Figure 1:
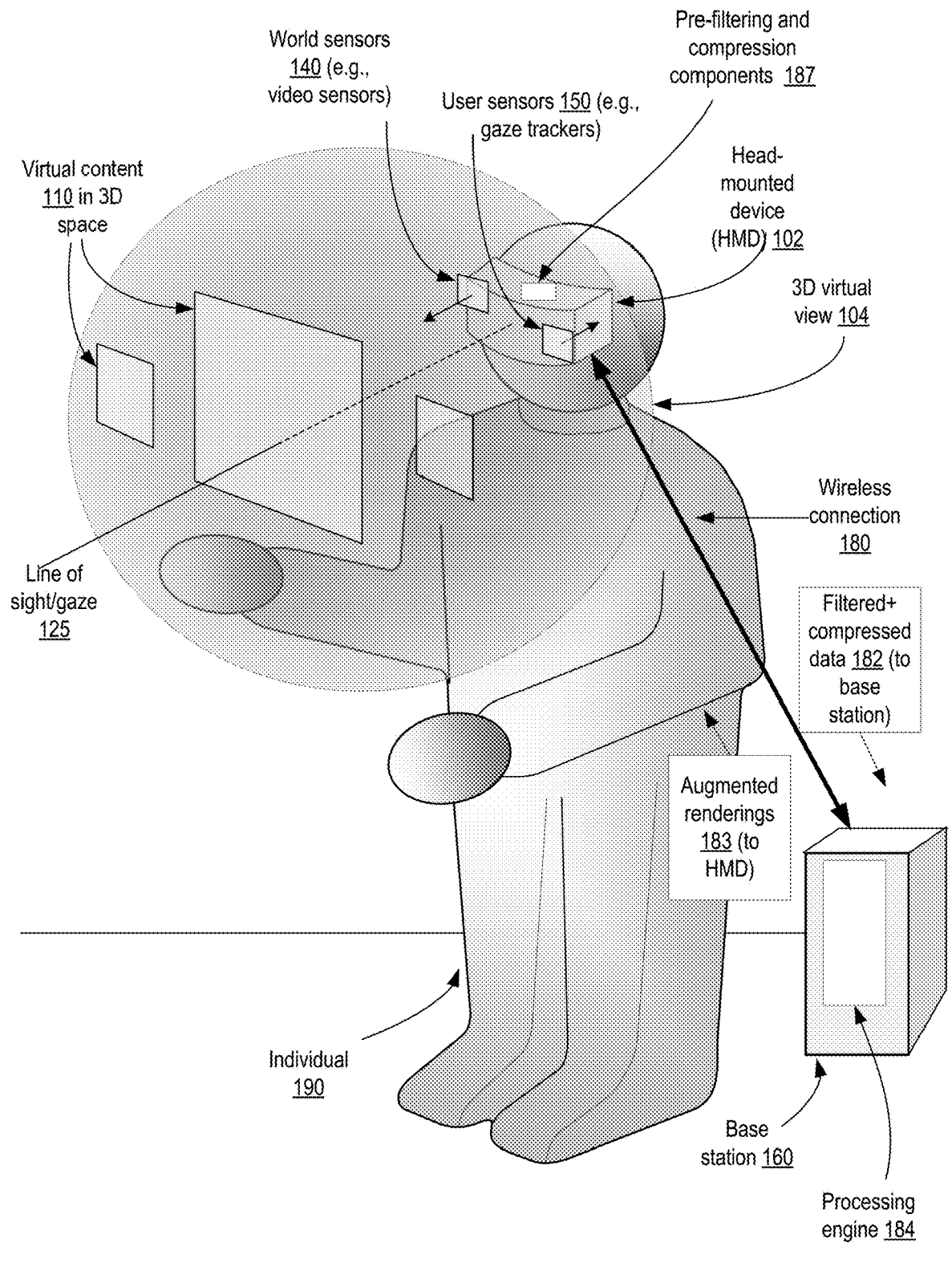
FIG. 1 illustrates an example system environment in which video data captured at a wearable device may be pre-filtered using a multi-layer low pass filter and compressed prior to transmission to a processing engine, according to at least some embodiments.

FIG. 1 illustrates an example system environment in which video data captured at a wearable device may be pre-filtered using a multi-layer low pass filter and compressed prior to transmission to a processing engine, according to at least some embodiments. In the depicted embodiment, system 100 may comprise various components of a mixed reality application. It is noted that although a mixed reality application represents one example of a type of scenario in which pre-filtering using multi-layer low pass filters may be employed for video data, similar pre-filtering techniques may be applied with equal success for a variety of other applications in different embodiments; that is, a mixed reality system is not a requirement for the use of multi-layered pre-filtering.

In various embodiments, a mixed reality (MR) system may combine computer generated information (referred to as virtual content) with real world images or a real world view to augment, or add content to, an individual's view of the world, or alternatively may combine representations of real world objects with views of a computer generated three-dimensional (3D) virtual world. In some embodiments, components of an MR application or system may, for example, include a head mounted device HMD 102 such as a headset, helmet, goggles, or glasses that may be worn by an individual or user 190, and a base station 160. The base station 160 may comprise a processing engine 184 configured to render mixed reality frames including virtual content 110 for display by the HMD 102. The HMD 102 and base station 160 may each include wireless communications technology that allows the HMD 102 and base station 160 to communicate and exchange data via a wireless connection 180.

In the depicted embodiment, video data representing at least some portions of an environment (which may comprise both real and virtual objects) of the individual 190 may be captured using world sensors 140 (which may include, for example, image sensors, video cameras, and the like). Virtual objects of the environment may be generated, for example, by VR (virtual reality), AR (augmented reality) or MR (mixed reality) applications in some embodiments. One or more user sensors 150, such as gaze tracking sensors, may be employed to monitor various aspects of the behavior and movement of individual 190; for example, the line of sight or gaze 125 of the individual may be tracked using sensors directed at the individual's eyes. As discussed below in further detail, the visual acuity or the resolution capability of the human eye may vary with the angular distance of the viewed object with respect to the central axis or direction of the gaze 125, and a technique which takes advantage of this variation in acuity may be used to pre-filter the video captured at the HMD in the depicted embodiment. For example, a multi-layer low-pass filtering algorithm may be applied using components 187 of the HMD to the raw video frames captured by one or more of the world sensors 140. The multi-layer low-pass filter may comprise a plurality of layers, including at least a first layer which is employed for filtering video data elements (e.g., pixels) representing objects close to the central direction of the gaze with a high resolution setting, and a second layer which is employed for filtering video data elements representing objects which are further away from the central direction of the gaze with a lower resolution setting. Because human visual acuity decreases with angular distance away from the central axis of the gaze, using lower resolution settings for objects at wider angles may result in little or no perceived distortion (if/when the filtered version of the video frame data were to be viewed, or an augmented version of the filtered version of the video frame were to be viewed).

The filtered version of the video data may then be compressed in a follow-on step in various embodiments, before being transmitted via the wireless connection 180 on to the base station 160 for processing. One or more hardware and/or software components 187 may be incorporated within the HMD 102 to implement the pre-filtering and compression algorithms in the depicted embodiment. The processing engine 184 at the base station 160 may, for example, analyze the received filtered and compressed version 182 of the video data, enhance it in various ways to augment the representation of the individual's environment, and transmit a representation of the modified version of the environment back as augmented renderings 183 to the HMD 102 for display to the individual. In some embodiments, as discussed below, multiple layers of pre-filtering may be employed. As a result of using the multi-layer filtering technique in combination with compression, the amount of network bandwidth required to render a high-quality representation of the environment may be reduced in various embodiments.

In some embodiments, world sensors 140 may collect additional information about the user 190's environment (e.g., depth information, lighting information, etc.) in addition to video. Similarly, in some embodiments, user sensors 150 may collect additional information about the individual 190, such as expressions, hand gestures, face gestures, head movements, etc. In one embodiment, in addition to using the pre-filtering and compression techniques on video data, the HMD 102 may transmit at least some of the other (non-video) information collected by sensors 140 and 150 to base station 160, e.g., without necessarily applying the filtering algorithms followed by compression. In some embodiments, the processing engine 184 of base station 160 may render frames 183 for display by the HMD 102 that include virtual content 110 based at least in part on the various information obtained from the sensors 140 and 150, and may compress the frames prior to transmitting the frames back to the HMD 102.

A 3D virtual view 104 may comprise a three-dimensional (3D) space including virtual content 110 at different depths that individual 190 sees when using the mixed reality system of FIG. 1. In some embodiments, in the 3D virtual view 104, the virtual content 110 may be overlaid on or composited in a view of the individual 190's environment with respect to the user's current line of sight that is provided by the HMD 102. HMD 102 may implement any of various types of virtual reality projection technologies in different embodiments. For example, HMD 102 may implement a near-eye VR technique that displays left and right images on screens in front of the individual 190's eyes that are viewed by a subject, such as techniques using DLP (digital light processing), LCD (liquid crystal display) and LCoS (liquid crystal on silicon) technology VR systems. As another example, HMD 102 may comprise a direct retinal projector system that scans left and right images, pixel by pixel, to the subject's eyes. To scan the images, left and right projectors may generate beams that are directed to left and right reflective components (e.g., ellipsoid mirrors) located in front of the individual 190's eyes; the reflective components may reflect the beams to the eyes. To create a three-dimensional (3D) effect, virtual content 110 at different depths or distances in the 3D virtual view 104 may be shifted left or right in the two images as a function of the triangulation of distance, with nearer objects shifted more than more distant objects.

While not shown in FIG. 1, in some embodiments a mixed reality system may include one or more other components.

For example, the system may include a cursor control device (e.g., mouse or trackpad) for moving a virtual cursor in the 3D virtual view 104 to interact with virtual content 110. Other types of virtual devices such as virtual keyboards, buttons, knobs and the like may be included in the 3D virtual view 104 in some embodiments. While FIG. 1 shows a single individual 190 and HMD 102, in some embodiments a mixed reality environment may support multiple HMDs 102 communicating with the base station 160 at the same time to enable multiple individuals 190 to use the system at the same time in a co-located environment. As mentioned above, pre-filtering techniques using multi-layer low-pass filters may be employed in some embodiments for applications other than or unrelated to mixed reality applications. For example, in one embodiment, such techniques may be used in security-related applications or medical/surgical applications involving video analysis.

Figure 2:
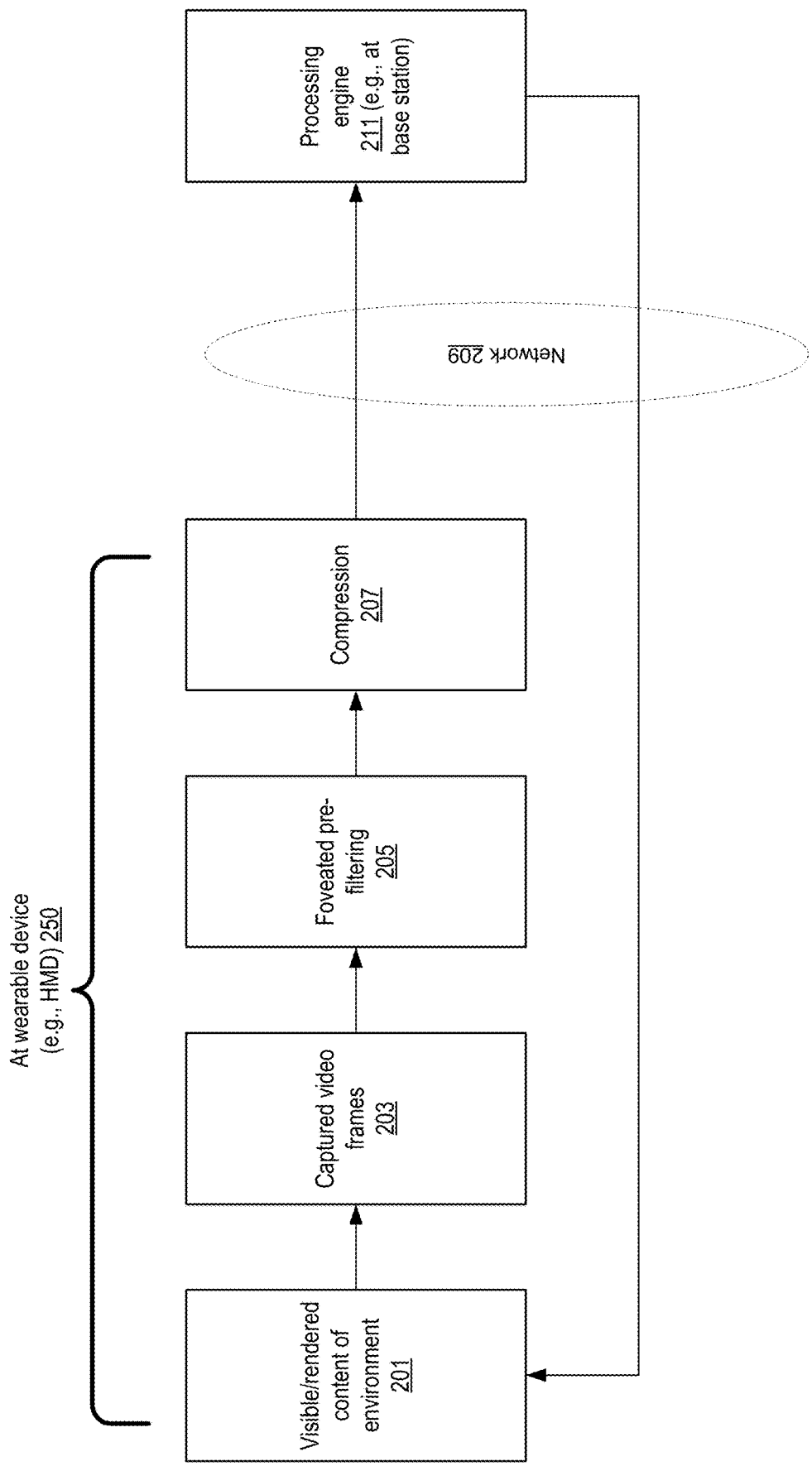
FIG. 2 illustrates an overview of a workflow in which video data is pre-filtered and compressed at a wearable device prior to being analyzed, according to at least some embodiments.

FIG. 2 illustrates an overview of a workflow in which video data is pre-filtered and compressed at a wearable device prior to being analyzed, according to at least some embodiments. In the depicted embodiment, visible or rendered portions 201 of an individual's environment may be captured in the form of a sequence of video frames 203. The video frame data may be transformed using a technique called foveated or gaze-based pre-filtering 205, described in further detail below. The fovea is a region of the retina in which visual acuity is highest, and the term "foveated" may be applied to the pre-filtering algorithms employed as the algorithms are designed to reduce network bandwidth usage based on taking advantage of the falloff in visual acuity with the angular distance from the fovea. The term pre-filtering may be employed in various embodiments because the filtering of the video frame data may be performed prior to compression 207 and transmission in such embodiments.

The filtered version of the video data frames may be transmitted to a processing engine 211 (e.g., at a base station of a mixed reality system) via network 209 in the depicted embodiment. In some embodiments, a wireless network may be employed, while in other embodiments one or more wired links may be used. In at least some embodiments, the processing engine 211 may be geographically distant from the devices at which the video data is captured, pre-filtered and compressed—e.g., in one extreme example the data may be captured at a vehicle in outer space and processed on Earth (or at another vehicle or station in outer space). In other embodiments, the processing engine 211 may be located fairly close to a wearable device 250 at which the video data is captured, filtered and compressed—for example, the processing engine may comprise one or more chips attached to clothing or a backpack carried by the individual using the wearable device at which the video is captured. After the received data has been processed, in various embodiments a data set representing a modified or enhanced version of the environment may be transmitted back to the wearable device 250 via the network 209, and displayed/rendered to the individual. It is noted that in various embodiments, one or more parameters of the pre-filtering algorithms may be customized for respective individuals, as discussed below in further detail, enabling the user experience with respect to the application being implemented using the video data to be optimized.

Figure 3:
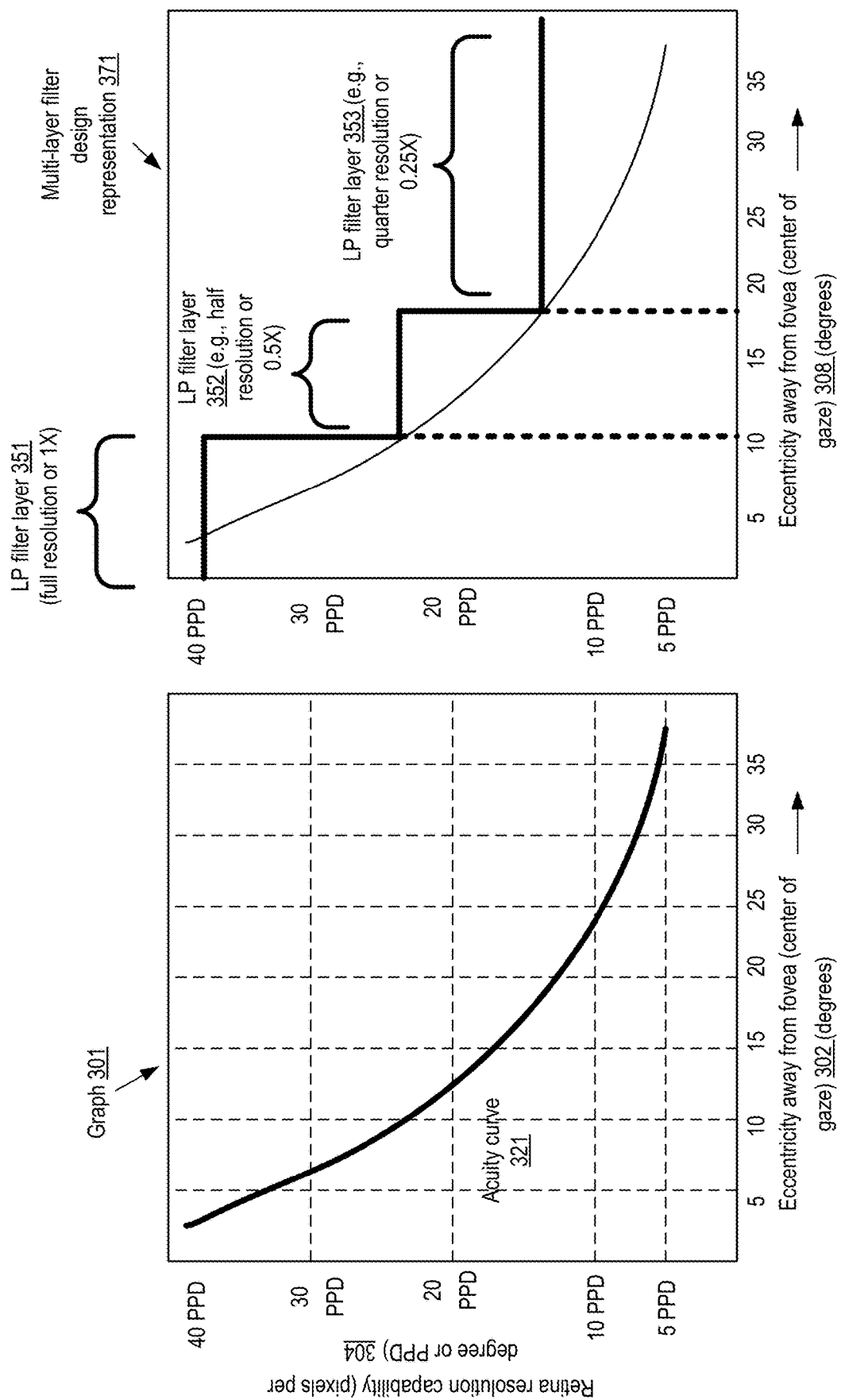
FIG. 3 illustrates an example of a three-layer low-pass filter whose design takes the falloff of visual acuity of a human eye with angular distance from the fovea into account, according to at least some embodiments.

FIG. 3 illustrates an example of a three-layer low-pass filter whose design takes the falloff of visual acuity of a human eye with angular distance from the fovea into account, according to at least some embodiments. In graph 301, a representation of the impact on visual acuity of angular distance away from the fovea is indicated. It is noted that graph 301 is provided primarily to illustrate the concept of reduced visual acuity with distance from the fovea, and is not intended to provide an exact (or even approximate) mathematical relationship between distance and visual acuity as such.

Along the X-axis 302 of graph 301, the eccentricity or angular distance on the retina, away from the centrally-located fovea, increases from left to right and is expressed in degrees. Along the Y-axis 304, a metric of the retina's resolution capability (i.e., the precision or fine-ness with which objects are perceived) increases from the bottom towards the top. The units "pixels per degree" are used to express the resolution capability in graph 301. As indicated, the highest resolution views (with the largest displacements from the origin along the Y direction) are obtained for objects that lie within a short angular distance from the fovea (with the smallest displacements from the origin along the X direction). The decrease in resolution with the increase in angular distance may be non-linear, as suggested by the acuity curve 321. It is noted that based on differences in anatomy, physiology and nervous system functions, the falloff in resolution with angular distance may differ for different individuals, and such person-to-person variations may be taken into account when customizing pre-filtering parameters in at least some embodiments as discussed below.

In the depicted embodiment, taking the drop-off in visual acuity into consideration, a three-layer low-pass filter may be designed to help reduce the amount of video data that has to be transmitted between a wearable device at which the video data is collected, and a processing engine where the video data is processed, while maintaining the perceived quality of the video at a high level. Representation 271 shows the relationship between the layers of the filter design and the acuity curve. A first high-resolution low-pass filter layer 351 (e.g., with 1× of the maximum resolution of the filter) may be used for visual elements closest to the central axis of the individual's tracked gaze in the depicted embodiment. The number of pixels per degree of the visual image in the output of the first layer of the filter (approximately 40 PPD in the illustrated example) may be the highest among the three layers in the depicted embodiment.

The resolution of a second filter layer 352, used for objects a little further away from the central direction of the gaze than the objects corresponding to layer 351, may be set to one-half the resolution of layer 351. Finally, the resolution of a third filter layer 353, used for objects further away from the central direction than the objects covered by filter layer 352, may be set to one-fourth the maximum resolution in the depicted embodiment. The boundaries between the filter layers (i.e., the subsets of the input frame data which are processed using respective filter functions for the three layers) may be set based at least in part on an estimated or approximated acuity curve 321 in various embodiments. Because of the inherent limitations of the human eye, the perceived impact of the reduction in resolution of the second and third filter layers may be negligible in various embodiments. As discussed below in further detail, in at least some embodiments the acuity curve may be approximated based on feedback from groups of users of the wearable device. In various embodiments, the goals of the pre-filtering design may include avoiding the introduction of perceivable artifacts or phenomena such as flickering, and various parameters such as the number of filter layers, the shapes of the layers, and so on may be selected and/or dynamically adjusted with such goals in mind. Although a three-layer filter is shown in FIG. 3, the number of layers may be smaller or large than three in different embodiments.

Figure 4:
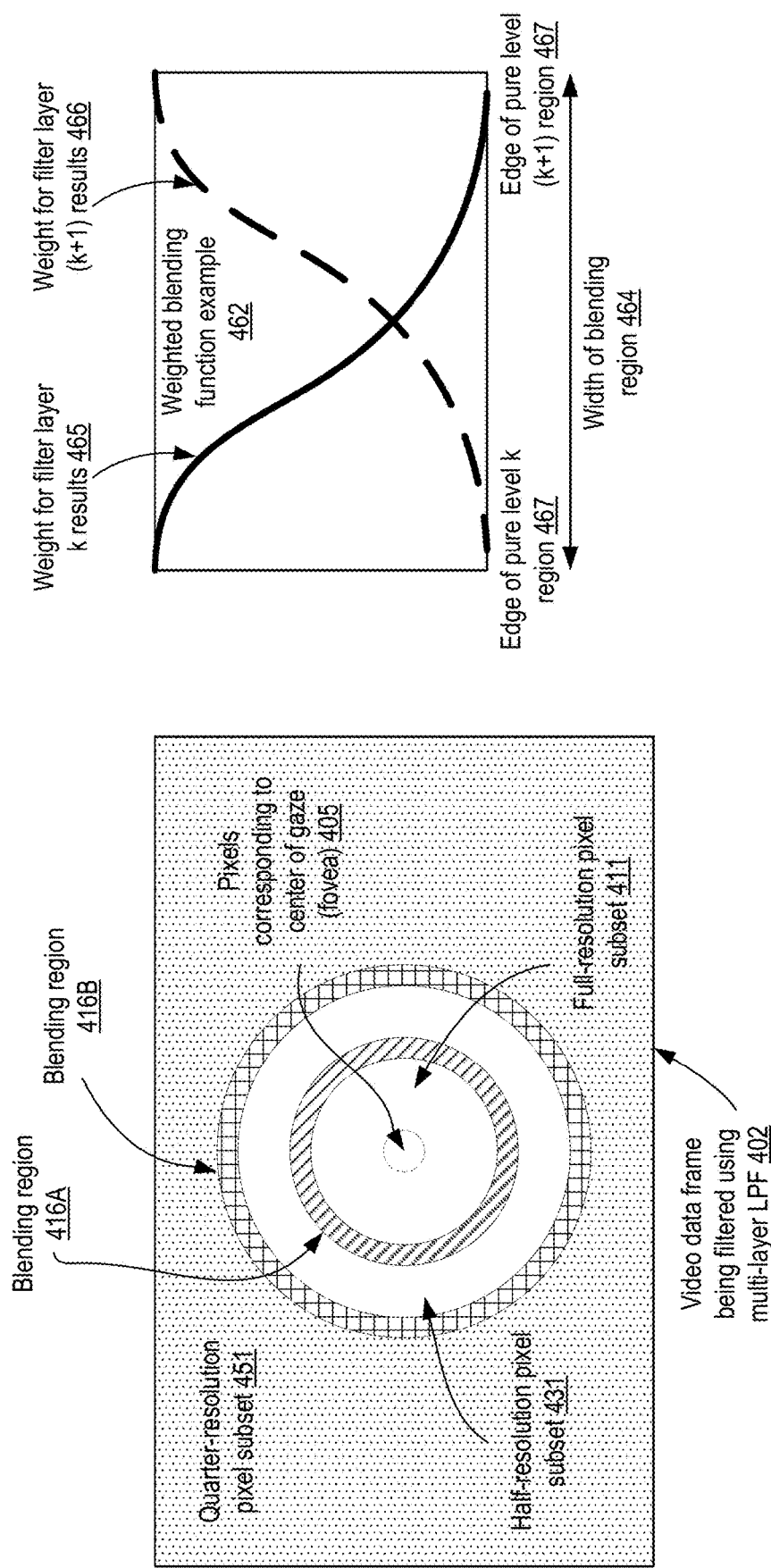
FIG. 4 illustrates examples of subsets of a video data frame to which filtering functions of a multi-layer low pass filter may be applied, according to at least some embodiments.

FIG. 4 illustrates examples of subsets of a video data frame to which filtering functions of a multi-layer low pass filter may be applied, according to at least some embodiments. Various subsets into which a video frame 402 may be logically subdivided for filtering are shown in the depicted example scenario. The gaze of the individual is assumed to be centered in the foveal region 405 in the example shown (as discussed earlier, gaze tracking sensors may be used to identify the foveal region in at least some embodiments). A full-resolution pixel subset 411, approximately circular in shape, may surround the foveal region 405; this set of pixels may be passed through the first of three layers of the filter in the depicted embodiment. A half-resolution pixel subset 431, concentric or approximately concentric with respect to pixel subset 411 and thus surrounding pixel subset 411, may be filtered using a second layer of the filter. The remainder of the frame, labeled subset 451 in FIG. 4, may correspond to the third filtering layer with a resolution setting of a quarter of the maximum resolution filter layer in the depicted embodiment. The geometric center of the quarter-resolution subset 451 may also be roughly the same as the centers of the other two subsets in some embodiments; however, as indicated in FIG. 4, the shapes of the subsets may differ from one another (e.g., the perimeter of subset 451 is roughly rectangular, while the other two subsets are roughly circular or ring-shaped). In various embodiments, any desired geometric shapes may be used for the different layers of a multi-layer low-pass filter—for example, oval/ ellipse shapes may be used instead of circular shapes in some embodiments for one or more filters. Not all the pixel subsets may necessarily share the same geometric center in some embodiments. In one embodiment, the selected shapes may take the anisotropy of the eye (e.g., differences in human vision performance along X and Y axes of a view or scene) into account. In the embodiment depicted in FIG. 4, if/when the individual changes the gaze direction, e.g., by moving the gaze to the left or the right, the subsets of the frames corresponding to the different layers may also move relative to the boundaries of the frame—e.g., the centers of subsets 411 and 431 may move to the left or right.

In at least some embodiments, a blending approach may be taken with respect to pixels or data elements that lie close to the boundaries between the frame subsets corresponding to the different layers of the filter. For example, in the depicted embodiment, two filtering functions may be applied to data within blending region 416A, and the results obtained from the two filtering functions may be combined or aggregated (e.g., using weighted summing) according to a blending function indicated in example 462. Consider a scenario in which filtering functions FF1, FF2 and FF3 respectively are used for the three filtering layers corresponding to subsets 411, 431 and 451. Both FF1 and FF2 may be applied to the data in blending region 416A, and then the results of the filtering for that region may be combined using a distance-weighted function. The weights assigned to the FF1 results for data elements closes to the region 411 may be highest, as indicated by curve 465, with the FF1-result weights falling as the distance increases from the edge 467 of the "pure" (unblended) level 1 region. In contrast, the weights assigned to FF1 results may be lowest closest to the fovea, and increase gradually as the distance to the pure (unblended) region 431 diminishes, as suggested by curve 466. Similar computations may be performed for blending region 416B, at the border between filtering subsets 431 (layer 2 of the filter) and 451 (layer 3 of the filter) in the depicted embodiment. The widths 464 of the blending layers, and the details of the weighted blending functions 462 applied, may differ in different embodiments. The data elements or pixels of the blending regions such as 416A and 416B may be referred to as blending target sets in some embodiments.

Figure 5:
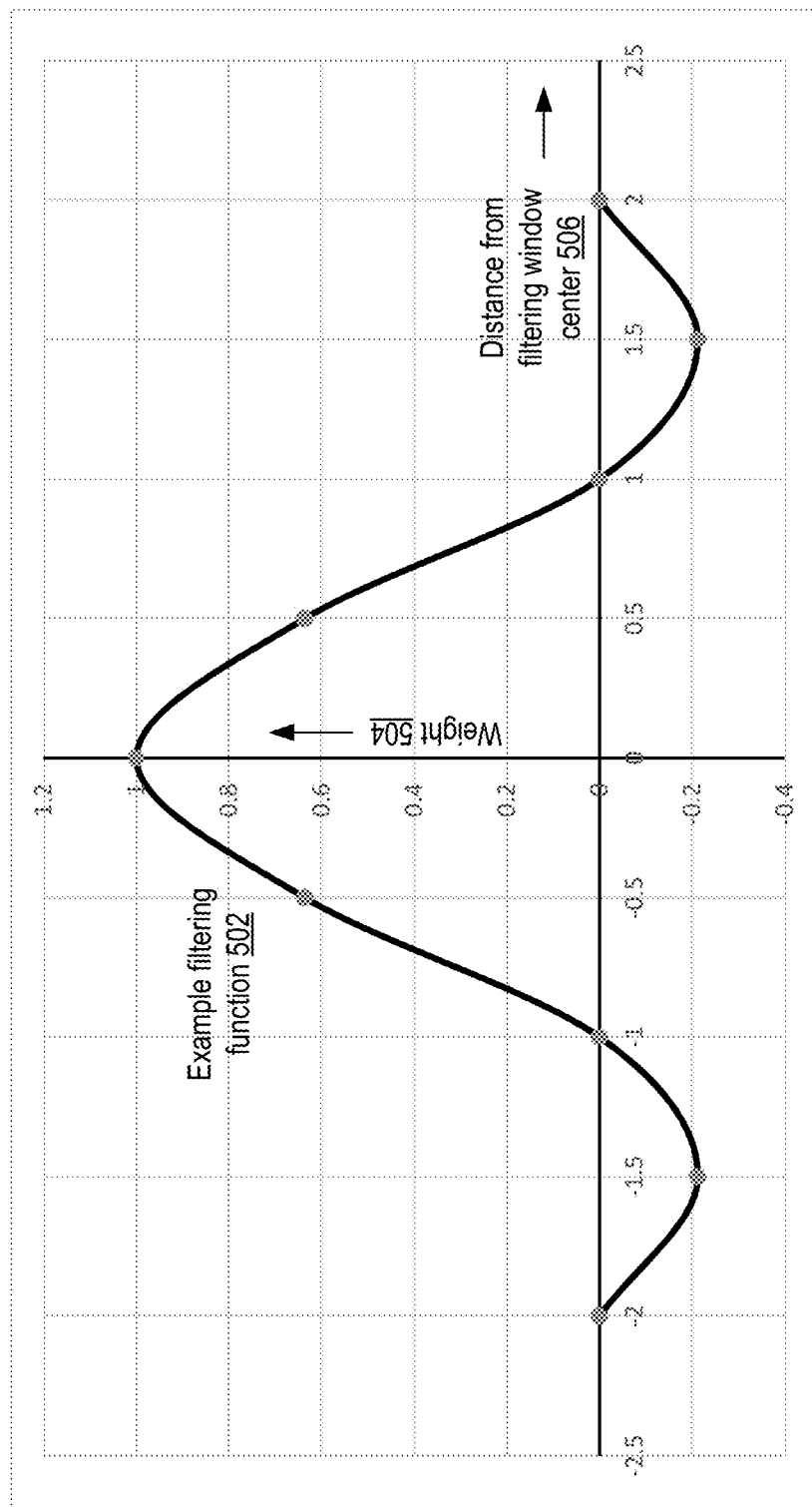
FIG. 5 illustrates an example shape of a filtering function which may be used for pre-filtering video data, according to at least some embodiments.

Any of a number of filtering functions may be employed for low pass filtering at individual layers of the multi-pass filter in different embodiments. FIG. 5 illustrates an example shape of a filtering function which may be used for pre-filtering video data, according to at least some embodiments. In the depicted embodiment, a function 502 similar to or based on the sinc (sine cardinal) function (e.g., $\sin(x)/x$, or $\sin(\pi x)/(\pi x)$) may be employed at one or more of the layers. As shown, the weight applied to the pixel content increase along the Y-axis of the graph, while the distance away from the center of the filtering window increases along the X-axis. The use of such a function, in conjunction with the selection of appropriate settings for a filtering window (the set of pixels or video data elements considered as an input unit for the filtering function) and for a color space (linear or gamma YUV) may help reduce the probability of introducing perceivable unwanted artifacts into the processed video in various embodiments. After the video data has been pre-filtered, as mentioned earlier, it may be compressed prior to transmission to a processing engine in various embodiments. Any of a variety of compression algorithms may be used in different embodiments, such as High Efficiency Video Coding (HEVC), also known as H.265, or MPEG-4 Part 10, Advanced Video Coding (MPEG-4 AVC), also referred to as H.264, etc.

Figure 6:
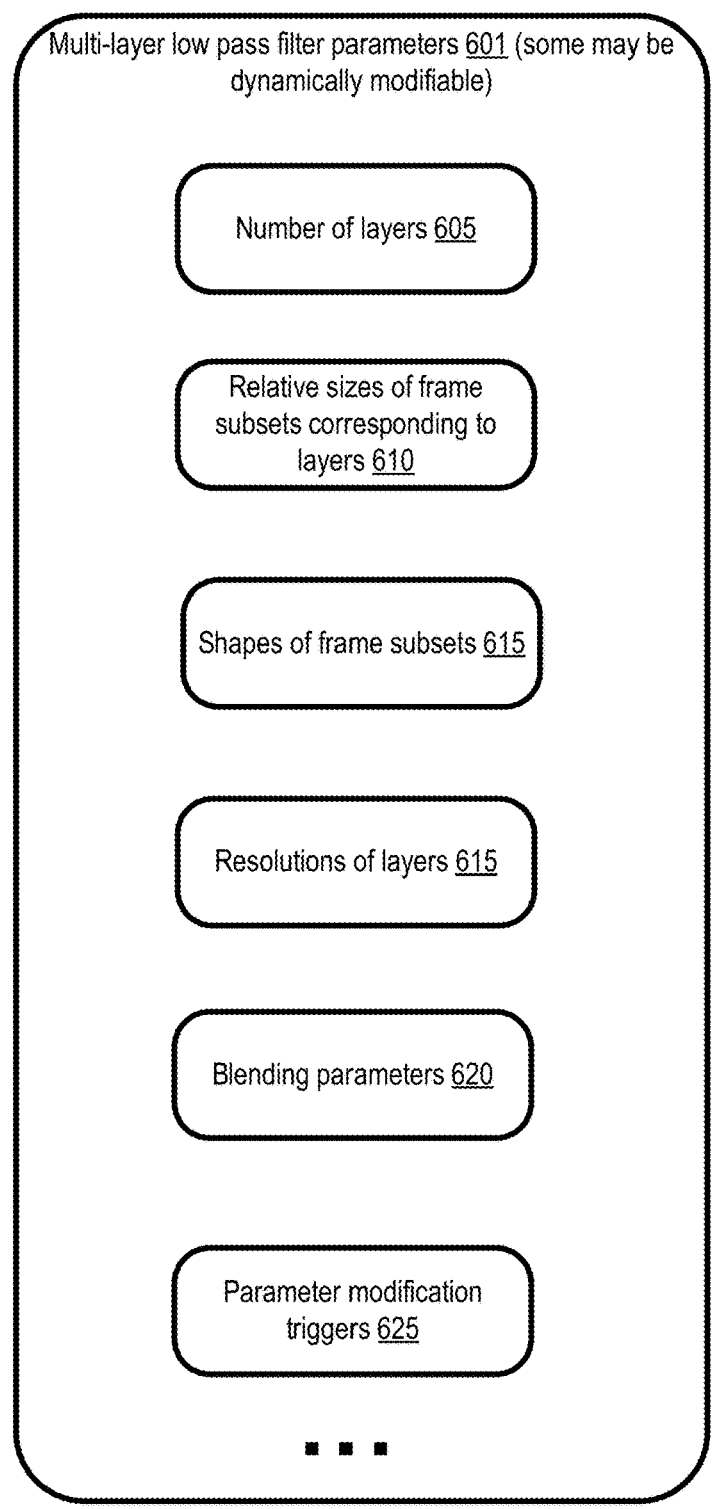
FIG. 6 illustrates examples of parameters of a multi-layer low-pass filtering system for video data, according to at least some embodiments.

Values of a number of parameters may have be selected and/or adjusted with respect to the pre-filtering technique discussed above in some embodiments. FIG. 6 illustrates examples of parameters of a multi-layer low-pass filtering system for video data, according to at least some embodiments. Example parameters 601 of the multi-layer low pass filter, at least some of which may be dynamically modifiable in various embodiments, may include the number of layers 605, the relative sizes 610 of the frame subsets corresponding to individual layers, the shapes of the frame subsets 615, the resolution settings 620 of the individual layers, blending parameters 625 associated with various pairs of layers, and/or parameter modification triggers 630.

In different embodiments, the number of layers 605 of the low-pass filter may vary, as discussed earlier. In some embodiments, a greater number of layers may allow a closer approximation of the visual acuity curve of the human eye, at the potential cost of somewhat higher computation costs due to the increased total blending of the filter results. The relative sizes of 610 of the subsets or regions of video data that are handled by the respective layers may impact the reduction in the size of the filtered and compressed data that is transmitted in various embodiments; for example, the larger the highest resolution subset is, the larger the amount of data that would on average have to be transmitted. Of course, the amount of compression achieved may also be a function of the nature of the scene being viewed—e.g., if a scene consists primarily of the sky, with very few objects, most of the scene may be compressed regardless of the filtering details.

Different shapes 615 for the subsets of data corresponding to the filter layers may be selected in various embodiments. Any combination of shapes such as circles, concentric rings, rectangles, other polygons, ovals and the like may be used for the different layers. The anisotropy of the eye may be used to determine the shapes in some embodiments. In at least some embodiments, several of the shapes 615 may be (at least approximately) concentric, e.g., the second layer may surround the first layer, the third layer may surround the second layer, and so on.

The relative resolution settings for the different layers may vary in different embodiments. In one embodiment, a power-of-two difference in resolution may be set; e.g., with the second layer having 0.5× the resolution of the first, the third layer having 0.5× the resolution of the second layer, and so on. Other resolution reduction ratios may be used in some embodiments—e.g., the second layer may be set to 0.67× the resolution of the first, the third layer may be set to 0.5× the resolution of the second, the fourth layer may be set to 0.33× the resolution of the third, and so on.

Blending parameters 625 may govern, for one or more pairs of adjacent filter layers, how wide the regions in which blending of filter outputs is to be performed, the details of the blending functions to be used, and so on in various embodiments. In some embodiments, symmetric or proportional blending weights may be used, in which as the weights assigned to filter output of one layer decreases, the weights for the other layer's output increases proportionately. In other embodiments, asymmetrical weights may be used.

In at least some embodiments, one or more parameters such as the number of layers, their relative sizes, shapes, resolution settings or blending parameters may be modified based on one or more triggering conditions 630. For example, in some embodiments, a default set of parameter values may be selected via relatively large scale experimentation involving user studies, in which feedback is obtained from numerous individuals regarding their respective visual acuity with respect to different types of video content, the user satisfaction achieved with various proposed parameter settings, and so on. Subsequently, after the wearable devices equipped with multi-layer filtering capabilities have been deployed for production or real-world use, changes may still be applied to some or all of the parameter settings based on one or more types of triggering conditions. For example, an individual who is dissatisfied with the current settings may submit a re-calibration request or command in some embodiments, and a re-calibration feedback session may be initiated to adjust the settings to the individual's preferences in some embodiments. In another embodiment, the wearable device may comprise a component configured to track the user's eye movements relative to an expected set of eye movements given the contents of the view provided to the user. If, for example, the direction of the gaze of the individual differs consistently over some time interval relative to the expected direction(s), this may indicate that the current filtering settings are not optimal for the user, and one or more of the parameter values may be adjusted automatically accordingly. The triggering conditions may themselves be considered a meta-parameter which can also be adjusted if needed in some embodiments.

Figure 7:
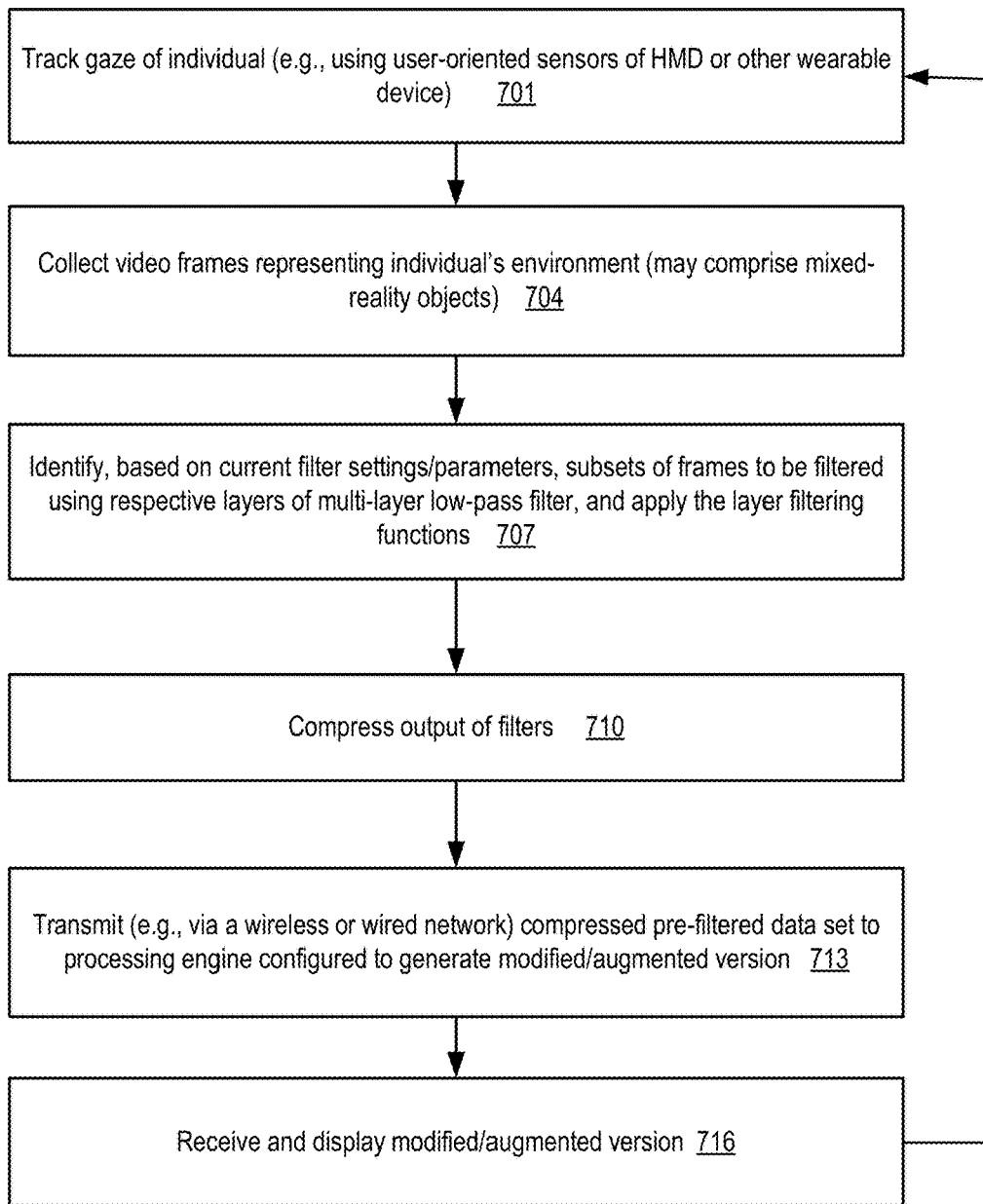
FIG. 7 is a flow diagram illustrating aspects of operations which may be performed to pre-filter video data using a multi-layer low pass filter prior to compressing and transmitting the data, according to at least some embodiments.

FIG. 7 is a flow diagram illustrating aspects of operations which may be performed to pre-filter video data using a multi-layer low pass filter prior to compressing and transmitting the data, according to at least some embodiments. As shown in element 701, the central direction of the gaze of an individual may be tracked, e.g., using a user-oriented set of sensors of a wearable device (such as an HMD of a mixed-reality system) being worn by the individual. The wearable device may comprise one or more hardware and/or software components which may collectively implement a configurable multi-layer pre-filtering algorithm in the depicted embodiment.

A sequence of data comprising video frames representing at least a portion of the individual's environment may be captured, e.g., using another set of outward-directed sensors of the wearable device in the depicted embodiment (element 704). The environment may comprise real-world objects and/or virtual objects in different embodiments; e.g., some of the objects apparent to the individual may be virtual objects rendered as a result of computations performed at an application or processing engine.

Based on the current parameter settings of the pre-filtering algorithm, the video frame data may be filtered in the depicted embodiment (element 707). Respective subsets of a given frame may be identified and processed using the respective filter functions of the different layers, for example, with blending functions being applied as discussed earlier at the boundary regions between the layers. The resolution settings for the filter layers closer to the central direction of the gaze of the individual with respect to a given frame may be higher than the resolution settings for filter layers further away from the central direction in at least some embodiments, thereby approximating the drop-off in visual acuity of the human eye. The filtered version of the frame data may be compressed (element 710), e.g., using any appropriate compression algorithm such as High Efficiency Video Coding (HEVC), also known as H.265, or MPEG-4 Part 10, Advanced Video Coding (MPEG-4 AVC), also referred to as H.264, etc.

At least a portion of the compressed representation of the pre-filtered video frame data may be transmitted via a network (e.g., a wireless or wired link) to a processing engine (element 713) in the depicted embodiment. The processing engine may be configured to generate a modified or augmented version of the video data in at least some embodiments. The modified/augmented version may be received at the wearable device (element 716) and displayed to the individual in various embodiments. This next set of displayed data may in turn be captured by the outward or world-oriented sensors, together with changes in the gaze direction (if any) of the individual, starting another iteration of gaze-direction-based pre-filtering, compression, transmission and modification in various embodiments, as indicated by the arrow leading from element 716 to element 701.

Figure 8:
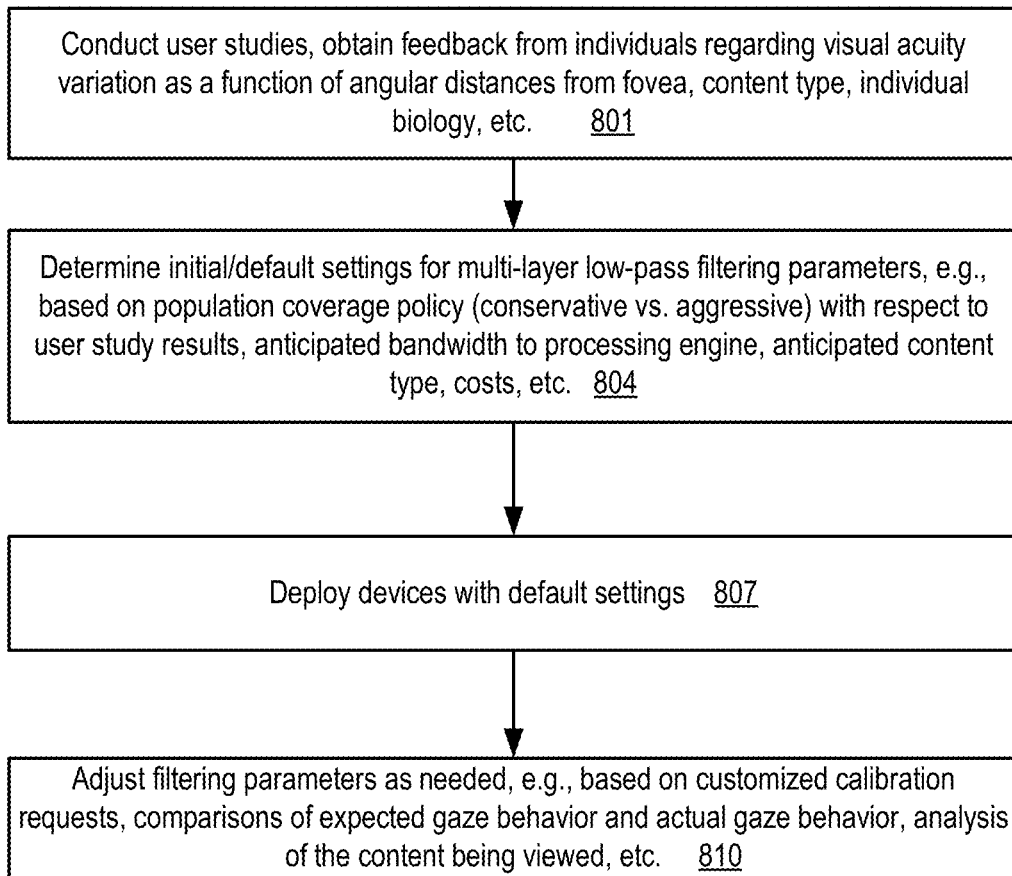
FIG. 8 is a flow diagram illustrating aspects of operations which may be performed to set initial values for, and later dynamically modify, parameter settings for pre-filtering video data, according to at least some embodiments.

FIG. 8 is a flow diagram illustrating aspects of operations which may be performed to set initial values for, and later dynamically modify, parameter settings for pre-filtering video data, according to at least some embodiments. As shown in element 801, one or more user studies may be conducted in the depicted embodiments. In a given user study, video content of one or more selected types (e.g., fast-changing scenes as may occur in a multi-user game, versus slower changing scenes as may occur during normal day-to-day interactions and activities) may be displayed to a set of individuals, the gaze directions (associated with the centers of foveated vision) of the individuals may be tracked, and the individuals may be asked to provide feedback regarding which portions of the videos are visible with the highest clarity or resolution. If a sufficiently large set of individuals participates in the user studies, a representative sample of the extent to which visual acuity varies as a function of angular distance away from the center of the gaze may be obtained for various types of content, taking biological variations among individuals into account. From an analysis of the user study results, it may for example be possible to determine the median falloff in visual acuity with angular distance with respect to the fovea, as well as percentiles (such as a respective visual acuity falloff representing 25% of the population, 75% of the population, 90% of the population and so on).

As shown in element 804, in at least some embodiments, initial/default settings for multi-layer low-pass pre-filtering parameters may be determined using the results of the user studies. The settings may, for example, include values for one or more of the parameters discussed in the context of FIG. 6, such as the number of layers, their respective resolutions and shapes etc. A number of factors may be taken into account to select settings for the pre-filtering in different embodiments. For example, a population coverage policy (conservative vs. aggressive) with respect to the user study results may impact the initial/default settings. In scenarios in which a conservative policy is implemented, the settings may be selected to cover the visual capabilities of a larger percentage (e.g., 75% or 90%) of the expected user population, e.g., with a larger first filter layer with maximum resolution. In contrast, if an aggressive strategy is used, the settings may be selected so as to cover 50% or 60% of the users, e.g., with a somewhat smaller maximum-resolution layer. Factors such as the anticipated bandwidth between the wearable device at which the pre-filtering and compression is to be performed and the processing engine where the data is analyzed/augmented, the type of content expected to be displayed to the individuals wearing the device, the costs associated with the filtering (e.g., per-layer computation costs, power-consumption costs, etc.) and the like may be taken into account in some embodiments.

As set of wearable devices and associated processing engines, with the pre-filtering parameters set to the initial or default values, may be deployed for production use in some embodiments (element 807). In at least one embodiment, one or more of the parameters may be dynamically adjusted after the initial deployment (element 810) based on various triggering conditions. For example, in some embodiments, if an individual using the wearable device dislikes or is not comfortable with the settings (e.g., if the user feels that their view is not clear enough), the individual may request a re-calibration operation. In such a re-calibration, the individual may participate in one or more feedback sessions in which videos are shown to the individual and the individual is asked to indicate which portions of the video are most clear. In some re-calibrations, one or more parameters of the pre-filtering may be modified as the individual interacts with the system, and the parameter settings with which the individual feels most at ease may be selected as the customized settings for the individual. In at least some embodiments, instead of utilizing re-calibration sessions per se, the eye movements (and/or other behaviors) of an individual may be analyzed to determine whether the individual's gaze is directed on portions of the view/scene on which the gaze was expected to be focused. If the individual's gaze behavior is unexpected, this may indicate that the pre-filtering parameter settings should be adjusted, and the settings may be modified accordingly in such embodiments. In one embodiment, the type of content that is being viewed may be analyzed to determine the extent of content similarity to the type of content which was shown in user studies from which the default parameter settings were determined, and if there is a significant difference in the content type, the settings may be adjusted accordingly. For example, if the scenes being viewed generally contain fewer contrasting objects than the video used for the default settings, the size of the highest-resolution layer of the filter may be reduced relative to the other layers in some embodiments.

Figure 9:
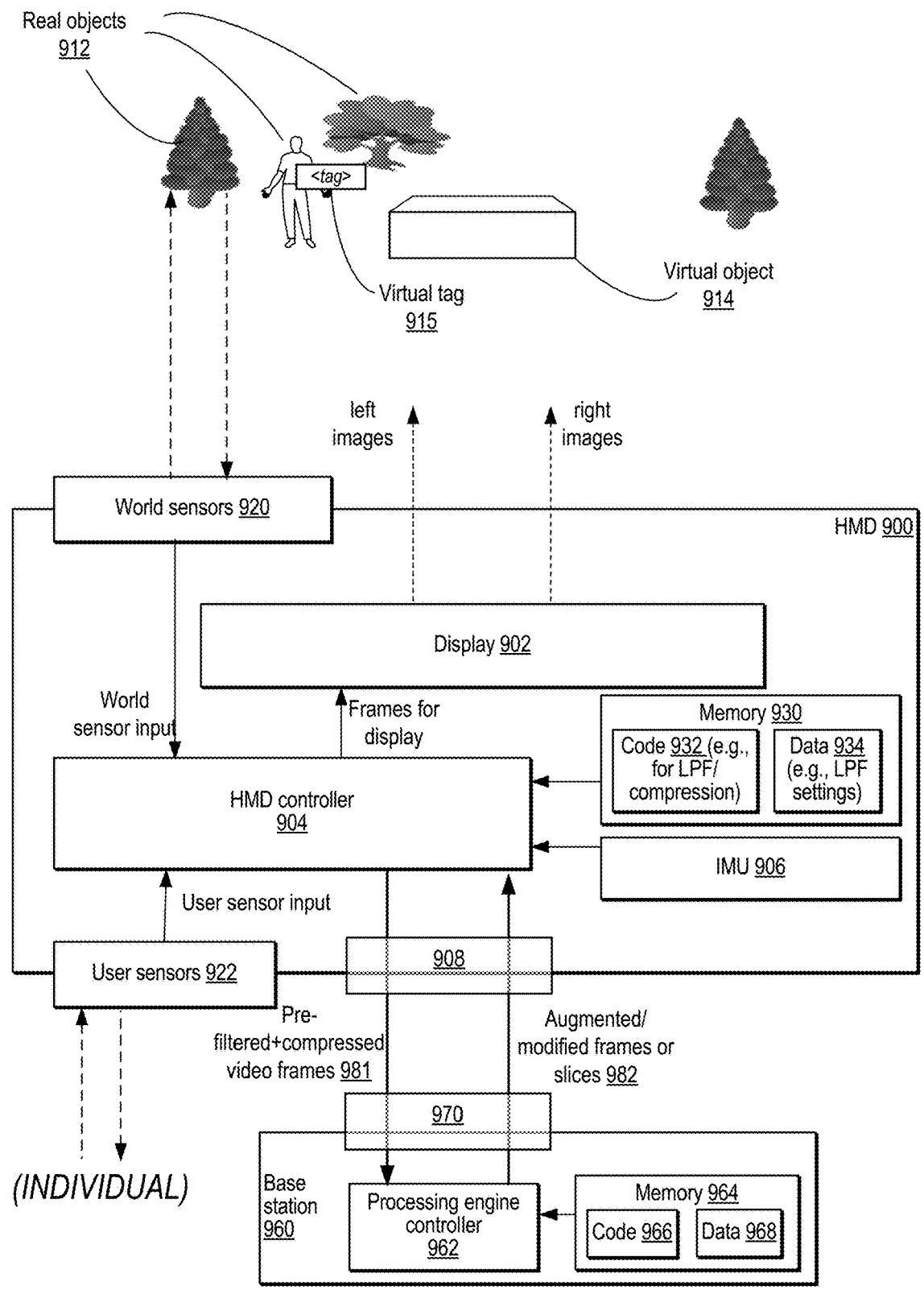
FIG. 9 is a block diagram of a mixed-reality system in which pre-filtering of video data may be performed, according to at least some embodiments.
Figure 10:
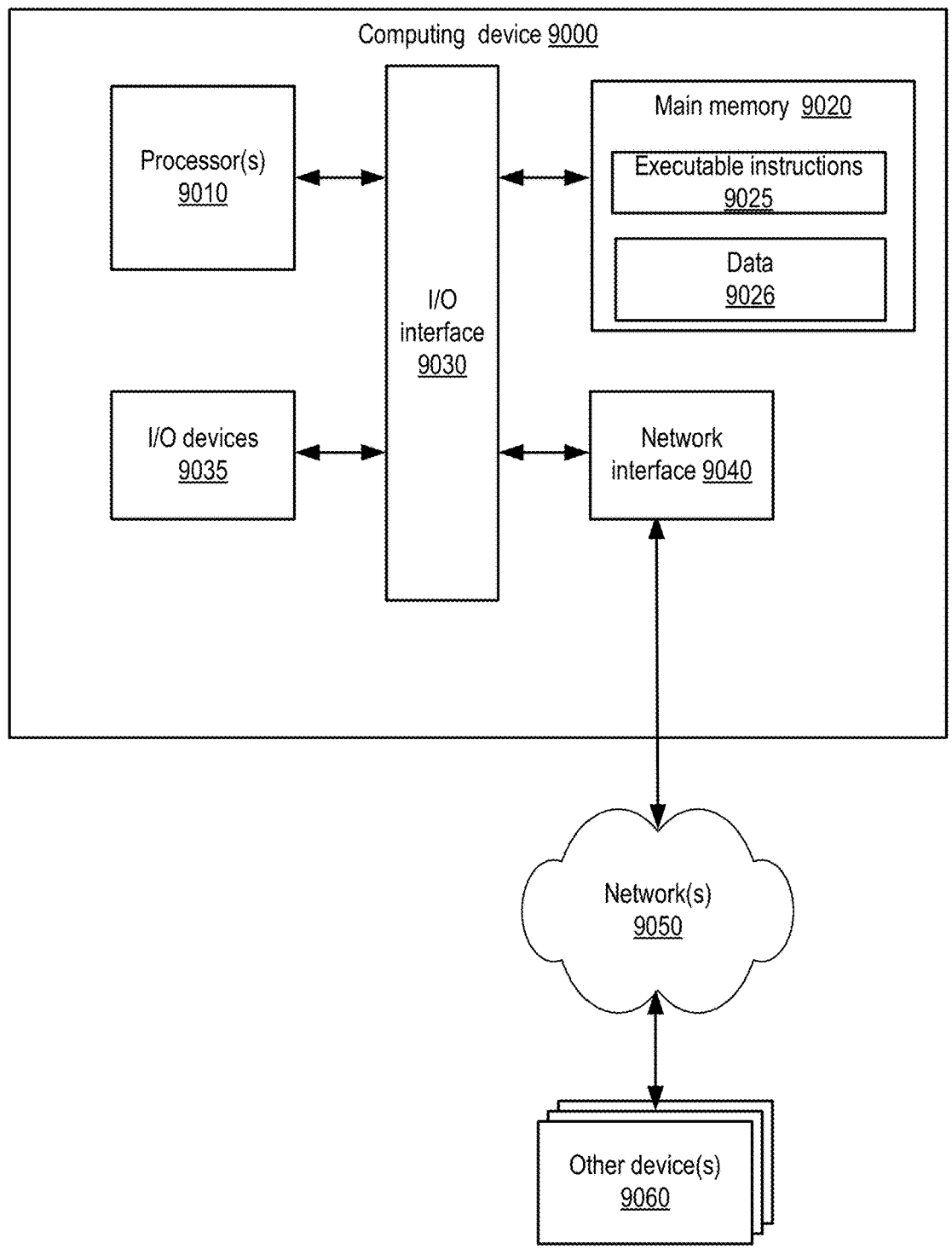
FIG. 10 is a block diagram illustrating an example computing device that may be used in at least some embodiments.

It is noted that in various embodiments, at least some operations other than those illustrated in the flow diagrams of FIG. 8 and FIG. 9 may be used to implement the adaptable pre-filtering techniques for video data described above. Some of the operations shown may not be implemented in some embodiments or may be implemented in a different order, or in parallel rather than sequentially.

FIG. 9 is a block diagram of a mixed-reality system in which pre-filtering of video data may be performed, according to at least some embodiments. In some embodiments, a mixed reality system may include a head mounted device (HMD) 900 such as a headset, helmet, goggles, or glasses, as well as a base station 960 (e.g., a computing system, game console, etc.).

HMD 900 may include a display 902 component or subsystem that may implement any of various types of virtual reality projector technologies. For example, the HMD 900 may include a near-eye VR projector that displays frames including left and right images on screens that are viewed by a user, such as DLP (digital light processing), LCD (liquid crystal display) and LCoS (liquid crystal on silicon) technology projectors. As another example, the HMD 900 may include a direct retinal projector that scans frames including left and right images, pixel by pixel, directly to the user's eyes via a reflective surface (e.g., reflective eyeglass lenses). To create a three-dimensional (3D) effect, objects at different depths or distances in the two images may be shifted left or right as a function of the triangulation of distance, with nearer objects shifted more than more distant objects.

HMD 900 may also include a controller 904 configured to implement HMD-side functionality of the mixed reality system as described herein. In some embodiments, HMD 900 may also include a memory 930 configured to store software (code 932) of the HMD component of the mixed reality system that is executable by the controller 904, as well as data 934 that may be used by the code 932 when executing on the controller 904. The code 932 may, in the depicted embodiment, include instructions for implementing a multi-layer low-pass filtering (LPF) algorithm and/or compression algorithms of the kind described earlier, while the data 934 may include values of the filtering-related parameter settings (such as those discussed with respect to FIG. 6).

In various embodiments, controller 904 may be a uniprocessor system including one processor, or a multiprocessor system including several processors (e.g., two, four, eight, or another suitable number). Controller 904 may include central processing units (CPUs) configured to implement any suitable instruction set architecture, and may be configured to execute instructions defined in that instruction set architecture. For example, in various embodiments controller 904 may include general-purpose or embedded processors implementing any of a variety of instruction set architectures (ISAs), such as the x86, PowerPC, SPARC, RISC, or MIPS ISAs, or any other suitable ISA. In multiprocessor systems, each of the processors may commonly, but not necessarily, implement the same ISA. Controller 904 may employ any microarchitecture, including scalar, superscalar, pipelined, super-pipelined, out of order, in order, speculative, non-speculative, etc., or combinations thereof. Controller 904 may include circuitry to implement micro-coding techniques. Controller 904 may include one or more processing cores each configured to execute instructions. Controller 904 may include one or more levels of caches, which may employ any size and any configuration (set associative, direct mapped, etc.). In some embodiments, controller 904 may include at least one graphics processing unit (GPU), which may include any suitable graphics processing circuitry. Generally, a GPU may be configured to render objects to be displayed into a frame buffer (e.g., one that includes pixel data for an entire frame). A GPU may include one or more graphics processors that may execute graphics software to perform a part or all of the graphics operation, or hardware acceleration of certain graphics operations. In some embodiments, controller 904 may include one or more other components for processing and rendering video and/or images, for example image signal processors (ISPs), coder/decoders (codecs), etc. In some embodiments, controller 904 may include at least one system on a chip (SOC).

Memory 930 may include any type of memory, such as dynamic random access memory (DRAM), synchronous DRAM (SDRAM), double data rate (DDR, DDR2, DDR3, etc.) SDRAM (including mobile versions of the SDRAMs such as mDDR3, etc., or low power versions of the SDRAMs such as LPDDR2, etc.), RAMBUS DRAM (RDRAM), static RAM (SRAM), etc. In some embodiments, one or more memory devices may be coupled onto a circuit board to form memory modules such as single inline memory modules (SIMMs), dual inline memory modules (DIMMs), etc. Alternatively, the devices may be mounted with an integrated circuit implementing system in a chip-on-chip configuration, a package-on-package configuration, or a multi-chip module configuration.

In some embodiments, the HMD 900 may include at least one inertial-measurement unit (IMU) 906 configured to detect position, orientation, and/or motion of the HMD 900 or subcomponents thereof, and to provide the detected position, orientation, and/or motion data to the controller 904 of the HMD 900.

In some embodiments, the HMD 900 may include world sensors 920 that collect information about the user's environment (video, depth information, lighting information, etc.), and user sensors 922 that collect information about the individual wearing the HMD (e.g., the individual's expressions, eye movement, hand gestures, etc.). The sensors 920 and 922 may provide the collected information to the controller 904 of the HMD 900. Sensors 920 and 922 may include, but are not limited to, visible light cameras (e.g., video cameras), infrared (IR) cameras, IR cameras with an IR illumination source, Light Detection and Ranging (LIDAR) emitters and receivers/detectors, and laser-based sensors with laser emitters and receivers/detectors.

HMD 900 may also include one or more wireless technology interfaces 908 configured to communicate with an external base station 960 via a wireless connection to send sensor-derived data to the base station 960 and receive compressed rendered frames or slices from the base station 960. In some embodiments, a wireless technology interface 908 may implement a proprietary wireless communications technology (e.g., 60 gigahertz (GHz) wireless technology) that provides a highly directional wireless link between the HMD 900 and the base station 960. However, other commercial (e.g., Wi-Fi, Bluetooth, etc.) or proprietary wireless communications technologies may be used in some embodiments. In one embodiment, communications between the HMD and the base station may be conducted over a wired rather than, or in addition to, a wireless link.

Base station 960 may be or may include any type of computing system or computing device, such as a desktop computer, notebook or laptop computer, pad or tablet device, smartphone, hand-held computing device, game controller, game system, and so on. Base station 960 may include a processing engine controller 962 comprising one or more processors configured to implement base-station-side functionality of the mixed reality system as described herein. Base station 960 may also include a memory 964 configured to store software (code 966) of the base station component of the mixed reality system that is executable by the controller 962, as well as data 968 that may be used by the code 966 when executing on the controller 962.

In various embodiments, processing engine controller 962 may be a uniprocessor system including one processor, or a multiprocessor system including several processors (e.g., two, four, eight, or another suitable number). Controller 962 may include central processing units (CPUs) configured to implement any suitable instruction set architecture, and may be configured to execute instructions defined in that instruction set architecture. For example, in various embodiments controller 962 may include general-purpose or embedded processors implementing any of a variety of instruction set architectures (ISAs), such as the x86, PowerPC, SPARC, RISC, or MIPS ISAs, or any other suitable ISA. In multiprocessor systems, each of the processors may commonly, but not necessarily, implement the same ISA. Controller 962 may employ any microarchitecture, including scalar, superscalar, pipelined, super-pipelined, out of order, in order, speculative, non-speculative, etc., or combinations thereof. Controller 962 may include circuitry to implement microcoding techniques. Controller 962 may include one or more processing cores each configured to execute instructions. Controller 962 may include one or more levels of caches, which may employ any size and any configuration (set associative, direct mapped, etc.). In some embodiments, controller 962 may include at least one graphics processing unit (GPU), which may include any suitable graphics processing circuitry. Generally, a GPU may be configured to render objects to be displayed into a frame buffer (e.g., one that includes pixel data for an entire frame). A GPU may include one or more graphics processors that may execute graphics software to perform a part or all of the graphics operation, or hardware acceleration of certain graphics operations. In some embodiments, controller 962 may include one or more other components for processing and rendering video and/or images, for example image signal processors (ISPs), coder/decoders (codecs), etc. In some embodiments, controller 962 may include at least one system on a chip (SOC).

Memory 964 may include any type of memory, such as dynamic random access memory (DRAM), synchronous DRAM (SDRAM), double data rate (DDR, DDR2, DDR3, etc.) SDRAM (including mobile versions of the SDRAMs such as mDDR3, etc., or low power versions of the SDRAMs such as LPDDR2, etc.), RAMBUS DRAM (RDRAM), static RAM (SRAM), etc. In some embodiments, one or more memory devices may be coupled onto a circuit board to form memory modules such as single inline memory modules (SIMMs), dual inline memory modules (DIMMs), etc. Alternatively, the devices may be mounted with an integrated circuit implementing system in a chip-on-chip configuration, a package-on-package configuration, or a multi-chip module configuration.

Base station 960 may also include one or more wireless technology interfaces 970 configured to communicate with HMD 900 via a wireless connection to receive sensor inputs from the HMD 900 and send compressed rendered frames or slices from the base station 960 to the HMD 900. In some embodiments, a wireless technology interface 970 may implement a proprietary wireless communications technology (e.g., 60 gigahertz (GHz) wireless technology) that provides a highly directional wireless link between the HMD 900 and the base station 960. In some embodiments, the directionality and band width (e.g., 60 GHz) of the wireless communication technology may support multiple HMDs 900 communicating with the base station 960 at the same time to thus enable multiple users to use the system at the same time in a co-located environment. However, other commercial (e.g., Wi-Fi, Bluetooth, etc.) or proprietary wireless communications technologies may be used in some embodiments.

The base station 960 may be configured to render and transmit frames to the HMD 900 to provide a 3D virtual (and potentially augmented) view for the individual based at least in part on input received after pre-filtering and compressing video data collected via world sensors 920 and/or user sensors 922 inputs. The virtual view may include renderings of the individual's environment, including renderings of real objects 912 in the user's environment, based on video captured by one or more scene cameras (e.g., RGB (visible light) video cameras) that capture high-quality, high-resolution video of the user's environment in real time for display. The virtual view may also include virtual content (e.g., virtual objects 914, virtual tags 915 for real objects 912, avatars of the individual, etc.) rendered and composited with the projected 3D view of the individual's real environment by the base station 960 in some embodiments.

In at least some embodiments, a server that implements a portion or all of one or more of the video pre-filtering and related processing techniques (e.g., including techniques for augmenting/enhancing video) described above may include a general-purpose computer system that includes or is configured to access one or more computer-accessible media. FIG. 11 illustrates such a general-purpose computing device 9000. In the illustrated embodiment, computing device 9000 includes one or more processors 9010 coupled to a main memory 9020 (which may comprise both non-volatile and volatile memory modules, and may also be referred to as system memory) via an input/output (I/O) interface 9030. Computing device 9000 further includes a network interface 9040 coupled to I/O interface 9030, as well as additional I/O devices 9035 which may include sensors of various types.

In various embodiments, computing device 9000 may be a uniprocessor system including one processor 9010, or a multiprocessor system including several processors 9010 (e.g., two, four, eight, or another suitable number). Processors 9010 may be any suitable processors capable of executing instructions. For example, in various embodiments, processors 9010 may be general-purpose or embedded processors implementing any of a variety of instruction set architectures (ISAs), such as the x86, PowerPC, SPARC, or MIPS ISAs, or any other suitable ISA. In multiprocessor systems, each of processors 9010 may commonly, but not necessarily, implement the same ISA. In some implementations, graphics processing units (GPUs) may be used instead of, or in addition to, conventional processors.

Memory 9020 may be configured to store instructions and data accessible by processor(s) 9010. In at least some embodiments, the memory 9020 may comprise both volatile and non-volatile portions; in other embodiments, only volatile memory may be used. In various embodiments, the volatile portion of system memory 9020 may be implemented using any suitable memory technology, such as static random access memory (SRAM), synchronous dynamic RAM or any other type of memory. For the non-volatile portion of system memory (which may comprise one or more NVDIMMs, for example), in some embodiments flash-based memory devices, including NAND-flash devices, may be used. In at least some embodiments, the non-volatile portion of the system memory may include a power source, such as a supercapacitor or other power storage device (e.g., a battery). In various embodiments, memristor based resistive random access memory (ReRAM), three-dimensional NAND technologies, Ferroelectric RAM, magnetoresistive RAM (MRAM), or any of various types of phase change memory (PCM) may be used at least for the non-volatile portion of system memory. In the illustrated embodiment, executable program instructions 9025 and data 1926 implementing one or more desired functions, such as those methods, techniques, and data described above, are shown stored within main memory 9020.

In one embodiment, I/O interface 9030 may be configured to coordinate I/O traffic between processor 9010, main memory 9020, and various peripheral devices, including network interface 9040 or other peripheral interfaces such as various types of persistent and/or volatile storage devices, sensor devices, etc. In some embodiments, I/O interface 9030 may perform any necessary protocol, timing or other data transformations to convert data signals from one component (e.g., main memory 9020) into a format suitable for use by another component (e.g., processor 9010). In some embodiments, I/O interface 9030 may include support for devices attached through various types of peripheral buses, such as a variant of the Peripheral Component Interconnect (PCI) bus standard or the Universal Serial Bus (USB) standard, for example. In some embodiments, the function of I/O interface 9030 may be split into two or more separate components, such as a north bridge and a south bridge, for example. Also, in some embodiments some or all of the functionality of I/O interface 9030, such as an interface to memory 9020, may be incorporated directly into processor 9010.

Network interface 9040 may be configured to allow data to be exchanged between computing device 9000 and other devices 9060 attached to a network or networks 9050, such as other computer systems or devices as illustrated in FIG. 1 through FIG. 10, for example. In various embodiments, network interface 9040 may support communication via any suitable wired or wireless general data networks, such as types of Ethernet network, for example. Additionally, network interface 9040 may support communication via telecommunications/telephony networks such as analog voice networks or digital fiber communications networks, via storage area networks such as Fibre Channel SANs, or via any other suitable type of network and/or protocol.

In some embodiments, main memory 9020 may be one embodiment of a computer-accessible medium configured to store program instructions and data as described above for FIG. 1 through FIG. 9 for implementing embodiments of the corresponding methods and apparatus. However, in other embodiments, program instructions and/or data may be received, sent or stored upon different types of computer-accessible media. Generally speaking, a computer-accessible medium may include non-transitory storage media or memory media such as magnetic or optical media, e.g., disk or DVD/CD coupled to computing device 9000 via I/O interface 9030. A non-transitory computer-accessible storage medium may also include any volatile or non-volatile media such as RAM (e.g. SDRAM, DDR SDRAM, RDRAM, SRAM, etc.), ROM, etc., that may be included in some embodiments of computing device 9000 as main memory 9020 or another type of memory. Further, a computer-accessible medium may include transmission media or signals such as electrical, electromagnetic, or digital signals, conveyed via a communication medium such as a network and/or a wireless link, such as may be implemented via network interface 9040. Portions or all of multiple computing devices such as that illustrated in FIG. 10 may be used to implement the described functionality in various embodiments; for example, software components running on a variety of different devices and servers may collaborate to provide the functionality. In some embodiments, portions of the described functionality may be implemented using storage devices, network devices, or special-purpose computer systems, in addition to or instead of being implemented using general-purpose computer systems. The term "computing device", as used herein, refers to at least all these types of devices, and is not limited to these types of devices.

CONCLUSION

Various embodiments may further include receiving, sending or storing instructions and/or data implemented in accordance with the foregoing description upon a computer-accessible medium. Generally speaking, a computer-accessible medium may include storage media or memory media such as magnetic or optical media, e.g., disk or DVD/CD-ROM, volatile or non-volatile media such as RAM (e.g. SDRAM, DDR, RDRAM, SRAM, etc.), ROM, etc., as well as transmission media or signals such as electrical, electromagnetic, or digital signals, conveyed via a communication medium such as network and/or a wireless link.

The various methods as illustrated in the figures and described herein represent exemplary embodiments of methods. The methods may be implemented in software, hardware, or a combination thereof. The order of method may be changed, and various elements may be added, reordered, combined, omitted, modified, etc.

Various modifications and changes may be made as would be obvious to a person skilled in the art having the benefit of this disclosure. It is intended to embrace all such modifications and changes and, accordingly, the above description to be regarded in an illustrative rather than a restrictive sense.

What is claimed is:

1. A method, comprising:
    filtering one or more video frames using a first set of values of parameters of a multi-layer low-pass filter of a device, wherein the multi-layer low-pass filter comprises a first layer and a second layer with respective filtering resolutions, the filtering comprising:
        for individual ones of the one or more video frames, applying the first layer to a first pixel subset of the video frame, and applying the second layer to a second pixel subset of the video frame;
    determining one or more properties of content of the one or more video frames; and
    modifying, based at least in part on the one or more properties, a value of at least one parameter of the multi-layer low-pass filter.

2. The method as recited in claim 1, wherein the one or more properties of the content comprises a contrast property.

3. The method as recited in claim 1, wherein the modifying comprises changing a size of a subset of a video frame to be filtered using the first layer of the multi-layer low-pass filter.

4. The method as recited in claim 1, wherein the device comprises a wearable device.

5. The method as recited in claim 1, wherein the device comprises a mixed reality system device.

6. The method as recited in claim 1, wherein a perimeter of a portion of a video frame filtered using the first layer comprises one of: (a) a circle, (b) an oval, or (c) a polygon.

7. The method as recited in claim 1, further comprising:
    displaying a modified visual representation of an environment represented in the one or more video frames, wherein the modified visual representation is obtained using a video processing engine to which a result of the filtering is provided as input.

8. A system, comprising:
    one or more processors; and
    one or more memories;
    wherein the one or more memories store program instructions that when executed on or across the one or more processors perform a method comprising:
        filtering one or more video frames using a first set of values of parameters of a multi-layer low-pass filter, wherein the multi-layer low-pass filter comprises a first layer and a second layer with respective filtering resolutions, the filtering comprising:
            for individual ones of the one or more video frames, applying the first layer to a first pixel subset of the video frame, and applying the second layer to a second pixel subset of the video frame;
        determining one or more properties of content of the one or more video frames; and
        modifying, based at least in part on the one or more properties, a value of at least one parameter of the multi-layer low-pass filter.

9. The system as recited in claim 8, wherein the one or more properties of the content comprises a contrast property.

10. The system as recited in claim 8, wherein the modifying comprises changing a size of a subset of a video frame to be filtered using the first layer of the multi-layer low-pass filter.

11. The system as recited in claim 8, wherein the method further comprises:
    modifying values of one or more parameters of the multi-layer low-pass filter based at least in part on feedback obtained from a user of a device at which the filtering is performed.

12. The system as recited in claim 8, wherein a perimeter of a portion of a video frame filtered using the first layer comprises one of: (a) a circle, (b) an oval, or (c) a polygon.

13. The system as recited in claim 8, wherein the method further comprises:
    compressing a result of the filtering of the one or more video frames; and
    transmitting a result of the compressing to a video processing engine configured to generate a modified visual representation of an environment represented in the one or more video frames.

14. The system as recited in claim 8, wherein the method further comprises:
    combining, using a blending function, a first filtering output produced by the first layer and a second filtering output produced by the second layer; and
    transmitting a result of the combining to a video processing engine configured to generate a modified visual representation of an environment represented in the one or more video frames.

15. One or more non-transitory computer-accessible storage media storing program instructions that when executed on or across one or more processors cause the one or more processors to perform a method comprising:
    filtering one or more video frames using a first set of values of parameters of a multi-layer low-pass filter, wherein the multi-layer low-pass filter comprises a first layer and a second layer with respective filtering resolutions, the filtering comprising:
for individual ones of the one or more video frames, applying the first layer to a first pixel subset of the video frame, and applying the second layer to a second pixel subset of the video frame;
determining one or more properties of content of the one or more video frames; and
modifying, based at least in part on the one or more properties, a value of at least one parameter of the multi-layer low-pass filter.

16. The one or more non-transitory computer-accessible storage media as recited in claim 15, wherein the one or more properties of the content comprises a contrast property.

17. The one or more non-transitory computer-accessible storage media as recited in claim 15, wherein the modifying comprises changing a size of a subset of a video frame to be filtered using the first layer of the multi-layer low-pass filter.

18. The one or more non-transitory computer-accessible storage media as recited in claim 15, wherein the method further comprises:
modifying values of one or more parameters of the multi-layer low-pass filter based at least in part on feedback obtained from a user of a device at which the filtering is performed.

19. The one or more non-transitory computer-accessible storage media as recited in claim 15, wherein a perimeter of a first portion of a video frame filtered using the first layer has a first shape, and wherein a parameter of a second portion of the video frame filtered using the second layer has a shape which differs from the first shape.

20. The one or more non-transitory computer-accessible storage media as recited in claim 15, wherein the method further comprises:
combining, using a blending function, a first filtering output produced by the first layer and a second filtering output produced by the second layer; and
transmitting a result of the combining to a video processing engine configured to generate a modified visual representation of an environment represented in the one or more video frames.

\* \* \* \* \*